United States Patent Office 3,102,229
Patented Aug. 27, 1963

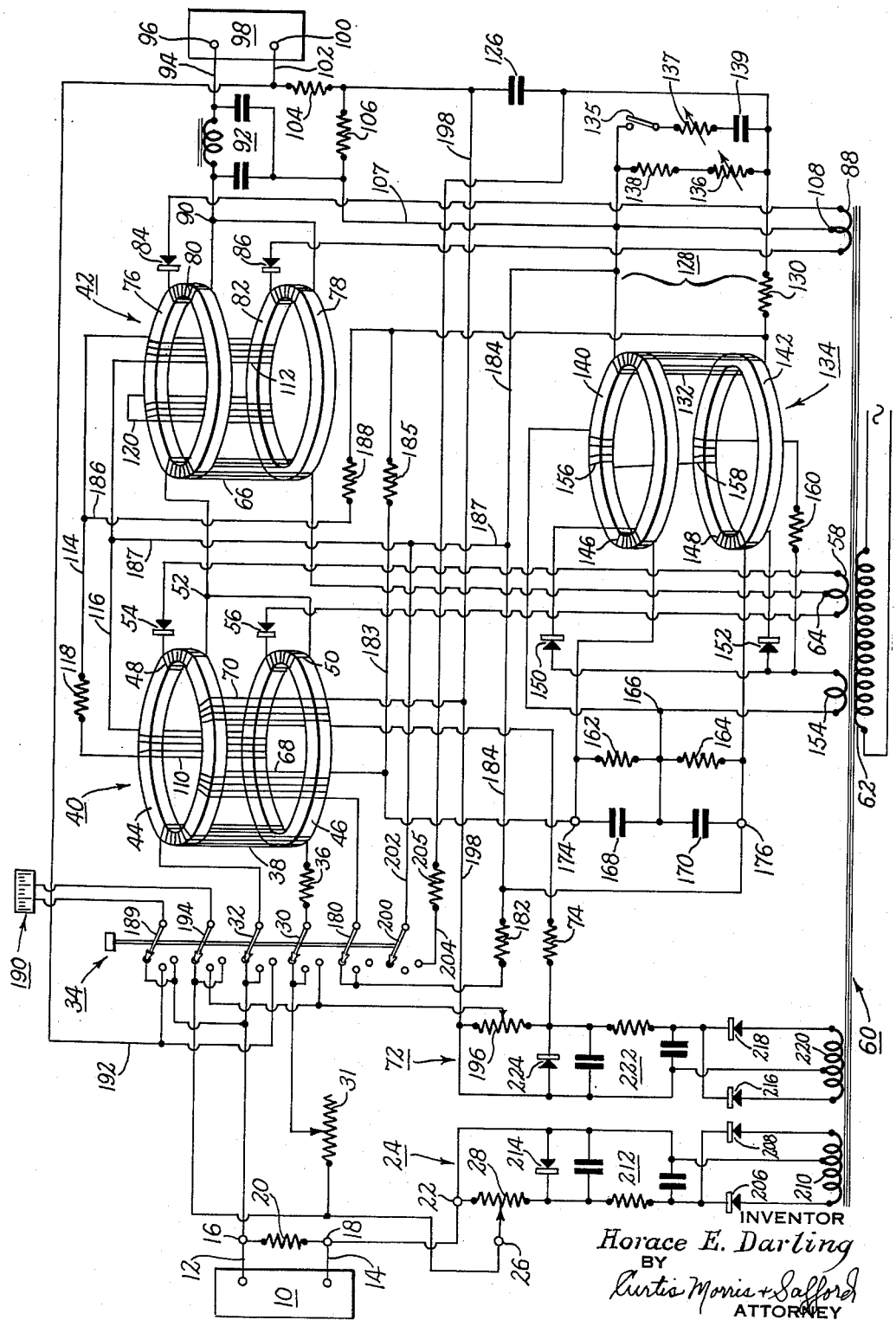

3,102,229
INDUSTRIAL PROCESS CONTROL APPARATUS EMPLOYING MAGNETIC AMPLIFICATION
Horace E. Darling, North Attleboro, Mass., assignor to The Foxboro Company, Foxboro, Mass.
Filed Mar. 26, 1958, Ser. No. 724,056
10 Claims. (Cl. 323—89)

This invention relates to control apparatus to be used with an industrial process for maintaining a condition of the process, such as liquid flow and the like, at a substantially constant value. More particularly, this invention relates to electrically-operated process controllers adapted to receive an electrical measurement signal proportional to the process condition, and to produce a corresponding electrical output signal for transmission to a process valve or the like to set the positioning of the valve so as to maintain the measured condition constant.

Process control systems utilizing electrically-operated controllers have of course been proposed from time to time heretofore. These all-electric systems have certain inherent advantages over earlier control systems such as those utilizing pneumatic pressure signals. For example, in an all-electric system the condition measurement signal and controller output signal can readily be transmitted considerable distances over conventional cables, which is a highly desirable feature for those installations where the control apparatus must be located remotely from the process. Other advantages, such as high speed of response, also make the all-electric systems attractive.

A number of the prior electric controller arrangements have employed vacuum-tube circuits, e.g. for intensifying the control signals to a suitable power level, and certain of these prior controllers have been useful in some applications. However, vacuum tubes are subject to failure after a more or less limited period of operation, and generally are not able, without special protective measures, to withstand the abuse to which industrial instrumentation equipment sometimes is subjected. Consequently, it is particularly desirable to provide an all-electric control system which utilizes more rugged and reliable elements for purposes of signal amplification and the related operations that must be performed.

To meet this need, there is provided in accordance with the present invention an industrial process controller which uses magnetic amplifying apparatus for producing the required output control signal, and which includes no vacuum tubes or the like. Because of the inherently rugged construction of magnetic amplifiers, this new controller is well adapted for continuous trouble-free operation over long periods in installations where ordinary electrical controllers would be subject to failure from adverse environmental conditions such as shock and vibration.

It has been found that the use of magnetic amplifying apparatus in industrial controllers presents a number of unique problems. For example, it is difficult to combine such apparatus with circuit means to produce "reset" action in the controller output signal. Reset action, as is well known, tends to prevent "droop" of the controlled condition away from the control set point, after a change in the process load. In effect, reset action tends to produce a slowly increasing (or decreasing, depending upon the direction of the load change) control signal which gradually augments the normal "proportioning" control action until the process condition has been returned substantially to its set point. Such a slowly changing signal is difficult to obtain with magnetic amplifier circuitry, partly due to the relatively low impedance levels of such circuitry. However, in accordance with an important aspect of the present invention, this problem has been solved by novel circuit arrangements as described and claimed herein.

Accordingly, it is an object of the present invention to provide industrial process control apparatus that is superior to such apparatus provided heretofore. It is a further object of this invention to provide an electrically-operated controller employing magnetic amplifying devices which are rugged in construction and not subject to damage from ordinary abuse. It is a still further object of this invention to provide such a controller having simple yet effective means to produce reset action in the output signal. Other objects, aspects and advantages of the present invention will be pointed out in, or apparent from, the following description considered together with the accompanying drawing which represents a schematic diagram of a controller constructed in accordance with this invention.

Referring now to the upper left-hand portion of the drawing, there is shown in block form a transmitter unit 10 which typically will be mounted adjacent industrial process equipment (not shown) to produce a measurement signal in accordance with the value of a process condition, such as flow rate, to be controlled. This transmitter, which can be of any suitable design known in the art, preferably is adapted to produce a direct-current measurement signal within the range of 10 to 50 milliamperes. This measurement signal is fed through a transmission line 12 and 14 to the input terminals 16 and 18 of the process controller to be described hereinbelow in more detail.

Bridged across the controller input terminals 16 and 18 is a resistor 20, having a resistance of 100 ohms, which serves as an electrical load to produce an input voltage proportional to the output current of the transmitter 10. Connected to the lower input terminal 18 is one terminal 22 of an adjustable D.-C. "set-signal" power supply, generally indicated at 24, the other terminal 26 of which is connected to the movable arm of a potentiometer 28 bridged across the output of the power supply. The D.-C. set signal produced at the terminals of this power supply is connected in series-opposition to the input voltage developed across the resistor 20. Thus, this arrangement serves as a signal comparison circuit to produce between the controller input termnial 16 and the power supply terminal 26 a "deviation signal" which represents by its magnitude and polarity the departure of the measured process condition from its desired value.

The deviation signal on terminals 16 and 26 is coupled through a variable resistor 31 (for making adjustments to the controller "proportioning band") to two sections 30 and 32 of an "automatic-to-manual" switch generally indicated at 34. With this switch in its "automatic" position (as shown), the deviation signal is fed through a small limiting resistor 36 to produce a flow of current in the input winding 38 of a magnetic amplifier consisting of two stages 40 and 42. The first stage 40 of this amplifier includes a pair of separate identical toroidal cores 44 and 46 of saturable magnetic material about which the input winding 38 is wound. Also wound about these cores respectively is a pair of output "gate" windings 48 and 50 connected together at a common point 52.

These gate windings 48 and 50 are energized, through corresponding rectifiers 54 and 56, by a center-tapped secondary winding 58 of a power transformer generally indicated at 60. The primary winding 62 of this transformer is connected to a source of A.-C. energizing potential, e.g. the usual 120 volt, 60-cycle power line. The center-tap 64 of the secondary winding 58 is connected through another input winding 66, forming part of the second stage of magnetic amplification 42, and thence back to the common point 52 between the gate windings 48 and 50.

Accordingly, the output circuit for the first magnetic amplifier stage 40 is a balanced full-wave arrangement wherein the gate windings 48 and 50 are energized during alternate half-cycles of the A.-C. energizing source. During the "firing" half-cycle (i.e. the half-cycle during which current flows) for either gate winding, the voltage across the winding builds up sinusoidally until the magnetic material of the corresponding core 44 or 46 saturates. At this point in the cycle, the voltage across the gate winding drops essentially to zero, and current flows from the transformer 60 and through the input winding 66 of the second magnetic amplifier stage 42 for the remainder of the half-cycle. The rectifiers 54 and 56 are polarized in such a manner that the current flowing through this input winding 66 will always be in the same direction, and it will be apparent that the average magnitude of this current will vary in accordance with changes in the point of the A.-C. energizing cycle at which saturation of the cores occurs.

The point in the energizing cycle at which saturation occurs is determined primarily by the magnitude of the "deviation signal" which produces a flow of current through the first stage input winding 38. For example, an increase in this current will cause the cores to saturate earlier in the energizing cycle, and thus a correspondingly larger average output current will flow through the gate windings 48 and 50 and the second stage input winding 66. In addition, the saturation point is influenced by a feedback winding 68 (to be described more fully hereinbelow) and by a bias winding 70 which is supplied with D.-C. current from a "manual-signal" power supply generally indicated at 72. The magnitude of the bias current is set, by a current-limiting resistor 74, at such a level that the controller output current normally will be 30 milliamperes when the current through the input winding 38 is zero.

The second magnetic amplifier stage 42 also includes a pair of identical toroidal cores 76 and 78 of saturable magnetic material, arranged in a manner similar to the cores 44 and 46 previously described. Cores 76 and 78 are biased to the required magnetic state by the interstage circulating current flowing through the second stage input winding 66, so that no separate bias winding is required. These cores also carry respective output gate windings 80 and 82 which are connected, with rectifiers 84 and 86, as a balanced full-wave output circuit energized by another center-tapped secondary winding 88 on the transformer 60.

The gate windings 80 and 82 are connected together at a common point 90, from which the D.-C. output current flows through a "pi" filter 92 and an output transmission line lead 94 to the upper terminal 96 of an electrical valve-operating device indicated in block form at 98. This device typically will be mounted adjacent the process and may be of conventional construction, e.g. of the type having a motor for controlling a valve (not shown) which is arranged to vary a characteristic of the process to maintain the measured process condition substantially constant. The current fed to this device is returned from the lower terminal 100 thereof through a transmission line lead 102, through a null-balance feedback resistor 104 (forming part of the circuitry used when the controller is operated manually, as will be explained), through a reset feedback resistor 106, and along a lead 107 to the center tap 108 of the secondary winding 88.

The second stage of magnetic amplification 42 operates in a manner similar to that of the first stage 40 previously described. That is, the level of current flowing through the second stage input winding 66 primarily determines the point in the A.-C. energizing cycle at which the cores 76 and 78 saturate, and accordingly controls the average magnitude of the D.-C. current flowing through the gate windings 80 and 82 to the valve-operating device 98. The filter 92 serves in the usual way to smooth out fluctuations in this output current.

The magnetic amplifier stages 40 and 42 are provided with stabilizing windings 110 and 112, respectively, which are connected together through a pair of wires 114 and 116 and a small (47 ohms) resistor 118. This stabilizing circuitry provides coupling for alternating current (primarily second harmonic) signals between the first and second stages 40 and 42 of the magnetic amplifier so as effectively to eliminate any tendency of the amplifier to oscillate or "hunt," and also to produce an essentially flat frequency-response without the usual resonant peaks. In operation, any change in flux through the first stage cores 44 and 46 produces a corresponding voltage in the stabilizing winding 110, and this voltage in turn causes a transient flow of current through the stabilizing winding 112 which tends momentarily to dampen the operation of the second amplifier stage 42, i.e. to delay the transmission of a signal through the two amplifier stages in a manner analogous to mechanical dashpot action. To minimize feedback from the second stabilizing winding 112 to the first stabilizing winding 110, the second stage cores 76 and 78 are provided with a short-circuited winding 120 (having, in this embodiment, 12 turns of No. 22 wire) which serves to absorb second-harmonic components in these cores and prevents harmful interaction between the two amplifier stages 40 and 42.

In accordance with a special feature of the present invention, the controller output current flowing through the valve-operating device 98 is caused to vary, so as to produce reset action, by means of a unique feedback circuit which couples the controller output circuit to the feedback winding 68 of the first magnetic amplifier stage 40. By means of this reset feedback circuit there is produced, in response to a change in the output current, a feedback signal tending to counteract such change. At the instant the controller output current changes, this feedback signal has a relatively large magnitude, and consequently the initial change in output current is considerably less than it would have been without the reset feedback circuit. However, the feedback circuit also is provided with electrical reactance means which operates, over a relatively long period of time, to gradually reduce the magnitude of the feedback signal to zero. Thus, for example, the output current will, for a given increase in input signal from the transmitter 10, initially increase to a corresponding new level and subsequently continue to increase to a much higher level as the feedback signal drops smoothly to zero.

For producing this feedback signal, a voltage proportional to the controller output current is developed across the reset feedback resistor 106 which is in series with the valve-operating device 98; obtaining the feedback signal in this manner assures that the feedback action is independent of the resistance of the device 98 and the associated transmission line. Any change in the voltage across the resistor 106 is coupled from the right-hand end of this resistor through a series reset capacitor 126, and to a shunt sensing circuit 128 consisting of an isolation resistor 130 in series with a reset winding 132; this latter winding serves as the input circuit of a "charging current amplifier" generally indicated at 134. The current path of the reset capacitor 126 is completed by a connection from the upper end of the reset input winding 132 to lead 107 and thence back to the left-hand end of the feedback resistor 106. Connected in parallel with the shunt sensing circuit 128 is a relatively large variable resistor 136, in series with a small fixed resistor 138, the resistor 136 serving as adjustment means for the reset action as will be explained.

Whenever there is a change in the voltage across the reset feedback resistor 106, this voltage change will initially appear across the sensing circuit 128 because the potential drop across the series capacitor 126 cannot change instantaneously. Subsequently, as the capacitor charges up (or discharges, depending upon the polarity of the voltage change across the feedback resistor 106), the voltage across the sensing circuit 128 will gradually diminish in magnitude until ultimately it reaches zero. Accordingly, the flow of current through the reset input winding 132 will initially correspond to the change in the controller output current, and will thereafter drop off to zero. The rate at which this current diminishes is determined by the rate at which the capacitor 126 charges up (or discharges), and this charging rate may be altered by adjusting the variable resistor 136.

Because the amplifier stages 40 and 42 are of the magnetic amplifier type, it is necessary to produce a reset feedback signal in the form of a current which initially has a magnitude comparable to the magnitude of the current change in the input winding 38. A feedback current of such magnitude cannot be obtained directly from the feedback resistor 106, partly because it would be necessary to employ a prohibitively large capacitor 126 in order to assure an adequate reset time. To solve this problem, the current flowing through the capacitor 126 is intensified by the charging current amplifier 134 which thus serves effectively to magnify the apparent capacitance of the capacitor 126 many times, e.g. of the order of 150 to 200 times.

It has been found that, to achieve superior controller operation, it is especially important to assure that the reset feedback signal is very stable. To this end, the charging current amplifier 134 is arranged in such a way that line voltage fluctuations and the like have essentially no effect on its output. In more detail, the reset input winding 132 is wound about a pair of separate identical toroidal cores 140 and 142 carrying respective output windings 146 and 148 which are energized simultaneously through corresponding identical rectifiers 150 and 152 connected to the right-hand end of a secondary winding 154 on the transformer 60. These output windings 146 and 148 are wound in opposite phase sense, i.e. the flux produced thereby in one of the cores 140 or 142 will be in a clockwise direction, while the flux produced in the other core will be in a counterclockwise direction. A pair of bias windings 156 and 158 also are wound on the cores 140 and 142 in opposite phase sense, and are energized through a current-limiting resistor 160 by the secondary winding 154.

The currents flowing through the respective output windings 146 and 148 are fed to a balanced load consisting of a pair of resistors 162 and 164 connected in series-opposition with their common point 166 returned to the left-hand end of the secondary winding 154. These load resistors are provided with respective shunt filter capacitors 168 and 170.

When the cores 140 and 142 are magnetized to an equal extent, as by means of the bias winding 156 and 158, the impedances presented by the respective output windings 146 and 148 will be equal and, with equal energization by the transformer secondary winding 154, the currents through these output windings will be equal. Consequently, with equal currents flowing through the output windings 146 and 148, there will be no voltage developed across the output terimnals 174 and 176 of the balanced load represented by the load resistors 162 and 164.

The reset input winding 132, being wound about both of the cores 140 and 142, will produce flux which opposes the magnetization of one of these cores and aids the magnetization of the other core. Assuming, for example, that the direction of current through this input winding is such as to increase the flux in the upper core 140 and decrease the flux in the lower core 142, then the upper core will saturate at an earlier point in the A.-C. energizing cycle than the lower core. Accordingly, more current will flow through the upper load resistor 162 than through the lower load resistor 164. Since these load resistors are connected in series-opposition, there will be developed between the output terminals 174 and 176 a D.-C. voltage having a magnitude proportional to the magnitude of the current in the reset input winding 132. The polarity of this voltage is, of course, determined by the direction of the current flow through the input winding.

It should particularly be noted that the charging current amplifier 134, by virtue of this differential winding arrangement, effectively avoids instability due to line voltage changes. For example, if there is an increase in the voltage produced by the power transformer secondary winding 154, there will be a corresponding increase in current through the output windings 146 and 148, but this increase in current will not produce any change in output voltage across the terminals 172 and 174 because the load resistors 162 and 164 are connected in series-opposition. Similarly, any change in current through the bias windings 156 and 158 will affect the magnetization of cores 140 and 142 equally, so that any resulting change in current through the output windings 146 and 148 again will be equal and hence balanced out by the opposed load resistor arrangement. To further assure stability of operation, the cores of this amplifier advantageously are formed of ring-shaped laminae mounted in a rigid metal box of annular shape as set forth in the copending application of the present applicant, Serial No. 540,783, filed October 17, 1955, now Patent No. 2,918,619.

The reset feedback circuit is completed by a connection between the output terminals 174 and 176 and the feedback winding 68 forming part of the first magnetic amplifier stage 40. This connection may be traced from the upper terminal 174 through the feedback winding, across a section 180 of the automatic-to-manual switch 34, and back through a series current-limiting resistor 182 to the lower terminal 176. The charging current amplifier 134 also is provided with a gain-setting direct-current feedback circuit consisting of a pair of leads 183 and 184 which connect the output terminals 174 and 176, through an isolating resistor 185, to the reset winding 132.

The stability of the controller is further improved by coupling the magnetic amplifier stabilizing windings 110 and 112 to the reset input winding 132 of the charging current amplifier 134. This is accomplished by a circuit which can be traced from the stabilizing winding 112, through the wires 114 and 116, through a respective pair of leads 186 and 187 and an isolating resistor 188 to the input winding 132. The A.-C. coupling afforded by this circuit serves to assure proper response of the controller, particularly by smoothing out resonant peaks and thereby providing a substantially flat frequency-characteristic curve. This coupling circuit also tends to cause a small fixed D.-C. unbalance in the output of the amplifier 134, but if desired this can readily be eliminated, e.g. by trimming one of the load resistors 162 or 164.

To adjust the "proportioning band" of the controller, the current-limiting resistor 182, in series with the feedback winding 68, may be a variable type which is manually settable to fix the magnitude of the current through this winding. Advantageously, however, the proportioning band is adjusted by the variable resistor 31 which is inserted in series with the input winding 38 of the first amplifier stage 40 to set the magnitude of the current flowing therethrough in accordance with the desired proportioning band, e.g. within the range of 100–500%. By these latter means, the magnetic amplifier stages 40 and 42 and the charging current amplifier 134 are independent of and unaffected by any changes in the controller proportioning band, which considerably simplifies the attainment of completely stable operation of these amplifiers.

Considering now the overall operation of the controller circuitry described hereinabove, when the measured process condition changes to a new level, there will be a corresponding change in the current flowing through the input winding 38 of the first stage of magnetic amplification 40. This signal is intensified by the two stages 40 and 42 and thereby changes the output current flowing to the valve-operating device 98. The change in output current produces a corresponding change in potential across the reset feedback resistor 106, and this potential change is coupled through the series reset capacitor 126 to produce a corresponding current flow through the reset input winding 132 of the charging current amplifier 134.

As a result, a direct-current voltage will appear across the output terminals 174 and 176 of the charging current amplifier 134 and thereby produce a corresponding flow of current through the feedback winding 68 of the first magnetic amplifier stage 40. This latter current will develop in the cores 44 and 46 a flux that tends to oppose the change in flux produced by the current flowing through the input winding 38. Consequently, the gain of the magnetic amplifier stages 40 and 42 will effectively be decreased so that the change in output current flowing to the valve-operating device 98 is held initially to a relatively low level, e.g. a change of one milliampere in the input winding 38 will initially produce a change of one milliampere in the output current.

As the series capacitor 126 gradually charges up (or discharges), the current flowing through the reset input winding 132 will slowly diminish to zero. As this occurs, the voltage across the output terminals 174 and 176 correspondingly diminishes, as does the current flowing through the feedback winding 68. Thus, this feedback winding develops less flux in opposition to the input winding flux, and consequently the output current flowing to the valve-operating device 98 will gradually increase. In other words, the "current gain" of the amplifier stages 40 and 42 gradually increases, e.g. to a maximum value of about 12,500.

This gradual increase in effective gain of amplification provides "reset" action which serves to compensate for the usual "droop" characteristic encountered in proportioning-type controllers. In an embodiment of the present invention built and successfully operated, the maximum reset "time constant" was 30 seconds, i.e. assuming the reset feedback circuit to be isolated from the other elements of the controller, if the output current through the feedback resistor 106 changed from zero to a constant level, the series capacitor 126 would charge up to 63 percent of its final value over a period of 30 seconds. This time-constant effect was especially achieved by utilizing as the series capacitor 126 a tantalum condenser having a capacitance of 250 microfarads. The isolation resistor 130 had a resistance of 270,000 ohms, and the reset input winding 132 had a resistance of about 1000 ohms. The resistors 136 and 138 had resistances of 2.5 megohms (max.) and 1000 ohms respectively, while resistors 104 and 106 had resistances of 100 and 150 ohms respectively. The resistance of the valve-operating device 98 may be about 600 ohms or so.

It may be noted that the resistance of the charging current path for the capacitor 126 can be decreased by adjusting the variable resistor 136. When the resistance of this latter resistor is zero, however, there still remains approximately 1000 ohms in the charging current path, due to the small resistor 138, which assures proper stability of operation when the controller is set for minimum reset time. In addition, any change in resistance of the resistor 136 has no effect on the initial magnitude of current flowing through the input winding 134, because the resistor 136 is in shunt across this winding. Consequently, changing the reset time does not alter the "proportioning band" of the controller.

In some industrial process applications, it is desirable to provide a controller arranged to produce "rate" action in the controller output signal. For this purpose, there is shown connected in parallel with the shunt sensing circuit 128 a series circuit consisting of a switch 135, a variable rate resistor 137 and a rate capacitor 139. By closing the switch 135, this series circuit alters the feedback signal fed to the shunt sensing circuit in such a way as to produce rate action. That is, when there is a change in output current through the feedback resistor 106, the rate capacitor 139 serves initially to absorb a portion of the resulting feedback signal and thereby temporarily delays the transmission of this signal to the input winding 132 and thence to the feedback winding 68. Thus, the controller output signal initially will be relatively large, having a magnitude determined in part by the rate-of-change of the deviation signal fed to the input winding 38, but will quickly drop off as the rate capacitor charges up through the rate resistor 137. It has been found that good results are obtained when the rate capacitor has a capacitance of 250 microfarads, with the rate resistor being variable up to a maximum of 100,000 ohms.

When it is desired to operate the controller manually, the "automatic-to-manual" switch 34 first is shifted to its "balance" position (intermediate the two extreme positions). In this position, the top section 189 of the switch connects one terminal of a voltage indicator 190 (e.g. mounted on the front panel of the controller chassis which is not shown herein) to a lead 192 which is connected to the upper end of the null-balance feedback resistor 104. At the same time, the next lower section 194 of this switch connects the other terminal of the indicator 190 to the movable arm of a potentiometer 196 which is shunted across the output of the manual signal power supply 72. The upper end of this potentiometer is connected by a lead 198 to the lower end of the null-balance feedback resistor 104.

The voltage across the potentiometer 196 is of opposite polarity with respect to the voltage across the null-balance feedback resistor 104, and accordingly the indicator 190 will read the difference between these two voltages. To prepare the controller for switch-over to manual operation, the movable arm of the potentiometer 196 is adjusted until the indicator 190 reads zero, at which time the switch 34 is shifted to its lowermost ("manual") position.

With the switch 34 in its "manual" position, section 32 of this switch connects the upper end of the first stage input winding 38 to the lead 192 which extends to the upper end of the null-balance feedback resistor 104. The next lower section 30 of this switch connects the lower end of the input winding 38 to the movable arm of the potentiometer 196 in the manual-signal power supply 72. As explained above, at the instant of switchover the voltage across the null-balance feedback resistor 104 will be equal but opposite in polarity to the voltage picked off by the potentiometer 196, and consequently there will be substantially no current flowing through the input winding 38 after switchover. Since the null-balance feedback resistor 104 provides negative feedback action, the magnetic amplifier stages 40 and 42 will tend to maintain the current through this resistor 104 constant, i.e. so as to produce a "null" at the input of the first magnetic amplifier stage 40. For that reason, the shift to manual operation will not produce any large change in output current flowing to the valve-operating device 98 which might tend to upset the process being controlled.

Once the system has been switched to manual operation, the process valve can be repositioned as desired merely by varying the setting of the manual supply potentiometer 196. The reset feedback circuit is effectively disabled by the lowest section 200 of the switch 34, which in manual position shorts out the sensing circuit 128 through leads 202, 187 and 184 on one side; and through a lead 204 and a small (100 ohm) resistor 205 on the other side.

The set-signal power supply 24 includes a full-wave rectifier circuit consisting of two diodes 206 and 208 energized in the usual manner by a center-tapped secondary winding 210 on the power transformer 60. The D.-C. output of this rectifier circuit is smoothed by an RC filter 212, and a reverse-connected silicon diode 214 is connected in shunt across this filter to maintain the output voltage substantially constant. Further details of a diode regulating arrangement of this general type will be found in the copending application of the present applicant, Serial No. 540,783, filed October 17, 1955.

The manual-signal power supply 72 is effectively identical to the set-signal power supply 24, and includes a full-wave rectifier circuit having a pair of diodes 216 and 218 energized by a center-tapped secondary winding 220 on the power transformer 60. The D.-C. output of this full-wave rectifier is smoothed by an RC filter circuit 222 having a reverse-connected voltage-regulating silicon diode 224 connected in shunt across its output.

Although a specific preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. Magnetic amplification apparatus for use in industrial process control systems and the like, comprising, in combination, first and second magnetic amplifiers connected together in a cascaded arrangement, each of said amplifiers comprising saturable core means defining a pair of flux paths, input winding means for each of said magnetic amplifiers and coupled to the corresponding pair of flux paths, output winding means for each of said magnetic amplifiers and coupled to the corresponding pair of flux paths, means coupling the output winding means of one of said magnetic amplifiers to the input winding means of the other of said magnetic amplifiers, and stabilizing means comprising A.-C. coupling means arranged to link together the respective core means of said first and second magnetic amplifiers so as to tend to delay the passage of a signal therethrough.

2. Control apparatus to be used with an industrial process for maintaining a variable condition of the process at a predetermined value; said apparatus comprising, in combination: set-signal means for producing a set signal having a preselected fixed magnitude, a signal comparison circuit coupled to said set-signal means for comparing a process condition measurement signal with said set signal, and thereby to produce a deviation signal the magnitude of which reflects the extent to which the measured process condition has deviated from the desired value thereof, a magnetic amplifier comprising two cascaded amplifier stages each including saturable core means, an input winding for said magnetic amplifier, circuit means for feeding said deviation signal to said input winding to control the flux in said core means, an output winding for said magnetic amplifier and adapted to be energized by a source of alternating current to produce an output current corresponding to said deviation signal, a negative feedback circuit coupled to said output winding and including means to produce at the input of said magnetic amplifier a feedback signal in opposition to said deviation signal; stabilizing means for said magnetic amplifier comprising A.-C. coupling means linking the core means of both of said amplifier stages together so as to tend to delay the passage of a signal through said magnetic amplifier; and output circuit means for transmitting an output signal, corresponding to said output current, to a device operable to influence a characteristic of said process so as to maintain said measured condition substantially constant.

3. Control apparatus to be used with an industrial process for maintaining a variable condition of the process at a predetermined value; said apparatus comprising, in combination: magnetic amplification means having an input circuit to receive an input signal corresponding to said variable condition, an output circuit for said magnetic amplification means to produce an output current related to said variable condition, negative feedback means coupled to said output circuit to develop a feedback signal corresponding to said output current, said feedback circuit forming a closed feedback loop including said magnetic amplification means; said magnetic amplification means comprising a magnetic amplifier having saturable magnetic core material defining first and second flux paths, input winding means for said magnetic amplifier, a high-impedance isolating circuit element connected in series with said input winding means, first and second output windings coupled respectively to said flux paths, A.-C. energizing means, first and second rectifier means coupled between said A.-C. energizing means and said first and second output windings respectively, said rectifier means being poled to pass current through said output windings simultaneously and only during one half-cycle of the A.-C. voltage wave, first and second load elements coupled to said first and second output windings respectively and connected in series-opposition to produce a differential output voltage thereacross; and circuit means for directing said feedback signal through said isolating circuit element and to said input winding means of said magnetic amplifier.

4. Control apparatus to be used with an industrial process for maintaining a variable condition of the process at a predetermined value; said apparatus comprising, in combination: set-signal means for producing a set signal having a preselected fixed magnitude, a signal comparison circuit coupled to said set-signal means and adapted to compare a process condition measurement signal with said set signal to produce a deviation signal the magnitude of which reflects the extent to which the measured process condition has deviated from the desired value thereof, a magnetic amplifier including saturable core means provided with an input winding, circuit means for feeding said deviation signal to said input winding to control the flux in said core means, an output winding for said magnetic amplifier and adapted to be energized by a source of alternating current to produce an output current corresponding to said deviation signal, a negative feedback circuit coupled to said output winding and including means to produce at the input of said magnetic amplifier a feedback signal in opposition to said deviation signal; said feedback circuit comprising a D.-C. circuit including a reactive element and a resistive element cooperable to cause said feedback signal to vary gradually over a period of time after a change in said deviation signal, said output current thereby being varied in a manner related both to said deviation signal and to the time-response of said feedback circuit; a second negative feedback circuit for said magnetic amplifier; said second feedback circuit being non-reactive so as to produce, when operably connected to said magnetic amplifier, a constant feedback signal in response to a constant output current from said magnetic amplifier; switch means having "automatic" and "manual" positions and arranged when shifted to "manual" position to disable the first-mentioned feedback circuit; means operably associated with said switch means for activating said second feedback circuit when said switch means is in "manual" position; and output circuit means for transmitting an output signal, corresponding to said output current, to a device operable to influence a characteristic of said process so as to maintain said measured condition substantially constant.

5. Apparatus as claimed in claim 4, wherein said second feedback circuit includes a resistor is series with the output of said magnetic amplifier to produce a feedback voltage proportional to said output current, an adjustable manual-signal power supply, and means connected to said switch means when in "manual" position for coupling the output of said power supply and the voltage across said resistor in series opposition and to the input of said magnetic amplifier.

6. Apparatus as claimed in claim 5, wherein said switch means also includes a "balance" position, and an indicator connected to said switch means arranged when in "balance" position to compare the output of said power supply with the voltage across said resistor.

7. Control apparatus to be used with an industrial process for maintaining a variable condition of the process at a predetermined value; said apparatus comprising, in combination: set-signal means for producing a set signal having a preselected fixed magnitude, a signal comparison circuit coupled to said set-signal means and adapted to compare a process condition measurement signal with said set signal to produce a deviation signal the magnitude of which reflects the extent to which the measured process condition has deviated from the desired value thereof, a magnetic amplifier including saturable core means provided with an input winding, circuit means for feeding said deviation signal to said input winding to control the flux in said core means, an output winding for said magnetic amplifier and adapted to be energized by a source of alternating current to produce an output current corresponding to said deviation signal, a negative feedback circuit coupled to said output winding; said feedback circuit comprising a D.-C. circuit including a reactive element and a resistive element cooperable to produce a feedback signal which varies gradually over a period of time after a change in said deviation signal, thereby to change said output current in a manner related both to said deviation signal and to the time-response of said feedback circuit; a feedback winding wound on said core means and connected to said feedback circuit to be energized by said feedback signal, a variable resistance connected in series with said input winding to permit an adjustment of the control proportioning band without affecting the stability of said magnetic amplifier, and output circuit means for transmitting an output signal, corresponding to said output current, to a device operable to influence a characteristic of said process so as to maintain said measured condition substantially constant.

8. Industrial process control apparatus adapted to receive a D.-C. measurement signal and to produce a D.-C. control signal for transmission to a process valve or the like to maintain a condition of the process at a predetermined value; said apparatus comprising, in combination: set-signal means for producing a set signal having a preselected fixed magnitude, a signal comparison circuit connecting said set-signal in series-opposition to said measurement signal to produce a deviation signal the magnitude of which corresponds to the extent to which the measured process condition has deviated from the desired value thereof, a magnetic amplifier including saturable core means provided with an input winding, circuit means for feeding said deviation signal to said input winding to control the flux in said core means, means for biasing said core means to a proper operating flux level, an output winding for said magnetic amplifier, rectifier means in series with said output winding, said rectifier means and said output winding being adapted to be energized by a source of alternating current to produce a D.-C. output current corresponding to said deviation signal, a resistor connected in series with said output winding to develop a D.-C. voltage corresponding to said D.-C. output current, a negative feedback circuit connected directly across said resistor and including means to produce at the input of said magnetic amplifier a feedback signal in opposition to said deviation signal; said feedback circuit comprising a D.-C. circuit including a series capacitance and a shunt resistance cooperable to cause said feedback signal to vary gradually over a period of time after a change in said deviation signal, said output current thereby being varied in a manner related both to said deviation signal and to the time-response of said feedback circuit; and output circuit means in series with said resistor for transmitting an output signal, corresponding to said output current, to a device operable to influence a characteristic of said process so as to maintain said measured condition substantially constant.

9. Control apparatus to be used with an industrial process for maintaining a variable condition of the process at a predetermined value; said apparatus comprising, in combination: magnetic amplification means having an input circuit to receive an input signal corresponding to said variable condition, an output circuit for said magnetic amplifiction means to produce an output current related to said variable condition and adapted to be transmitted to a process valve or the like, negative feedback means including reactive circuit means and forming a closed loop including said magnetic amplification means; said magnetic amplification means comprising a magnetic amplifier having saturable magnetic core material defining first and second flux paths, input winding means for said magnetic amplifier, first and second output windings coupled respectively to said flux paths, A.-C. energizing means, first and second rectifier means coupled between said A.-C. energizing means and said first and second output windings respectively, said rectifier means being poled to pass current through said output windings simultaneously and only during one half-cycle of the A.-C. voltage wave, first and second load elements coupled to said first and second output windings respectively and connected in series-opposition to produce a differential output voltage thereacross; and circuit means for directing the feedback signal to said input winding means of said magnetic amplifier.

10. Industrial process control apparatus adapted to receive a D.-C. measurement signal and to produce a D.-C. control signal for transmission to a process valve or the like to maintain a condition of the process at a predetermined value; said apparatus comprising, in combination: set-signal means for producing a set signal having a pre-selected fixed magnitude, a signal-sensing circuit responsive to said measurement signal and said set signal to produce a deviation signal the magnitude of which corresponds to the extent to which the measured process condition has deviated from the desired value thereof, a magnetic amplifier including saturable core means provided with an input winding, circuit means for feeding said deviation signal to said input winding to control the flux in said core means, means for biasing said core means to a proper operating flux level, an output winding for said magnetic amplifier, an output circuit connected to said output winding, said output circuit being adapted to be energized by a source of alternating current and including means to produce a D.-C. output current corresponding to said deviation signal, a negative feedback circuit connected to said output circuit and including means to produce at the input of said magnetic amplifier a feedback signal in opposition to said deviation signal; said feedback circuit comprising a D.-C. circuit including a capacitor and a resistor cooperable to cause said feedback signal to vary gradually over a period of time after a change in said deviation signal, said output current thereby being varied in a manner related both to said deviation signal and to the time-response of said feedback circuit; said output circuit including means for transmitting an output signal, corresponding to said output current, to a device operable to influence a characteristic of said process so as to maintain said measured condition substantially constant.

(References on following page)

References Cited in the file of this patent

UNITED STATES PATENTS

| | | |
|---|---|---|
| 2,429,724 | Krabbe | Oct. 28, 1947 |
| 2,552,952 | Gachet et al. | May 15, 1951 |
| 2,704,823 | Storm | Mar. 22, 1955 |
| 2,722,654 | Sikorra | Nov. 1, 1955 |
| 2,754,468 | Grillo | July 10, 1956 |
| 2,765,436 | Dornhoefer | Oct. 2, 1956 |
| 2,773,131 | Sokamoto | Dec. 4, 1956 |
| 2,793,336 | Geyger | May 21, 1957 |
| 2,802,166 | Sanderlin et al. | Aug. 6, 1957 |
| 2,853,675 | Estrada et al. | Sept. 23, 1958 |
| 2,854,620 | Steinitz | Sept. 30, 1958 |
| 2,862,112 | Ringelman et al. | Nov. 25, 1958 |